Sept. 11, 1928.                 E. K. NICKERSON                 1,683,625
                                VALVE CONSTRUCTION
                               Filed July 7, 1924            2 Sheets-Sheet 1
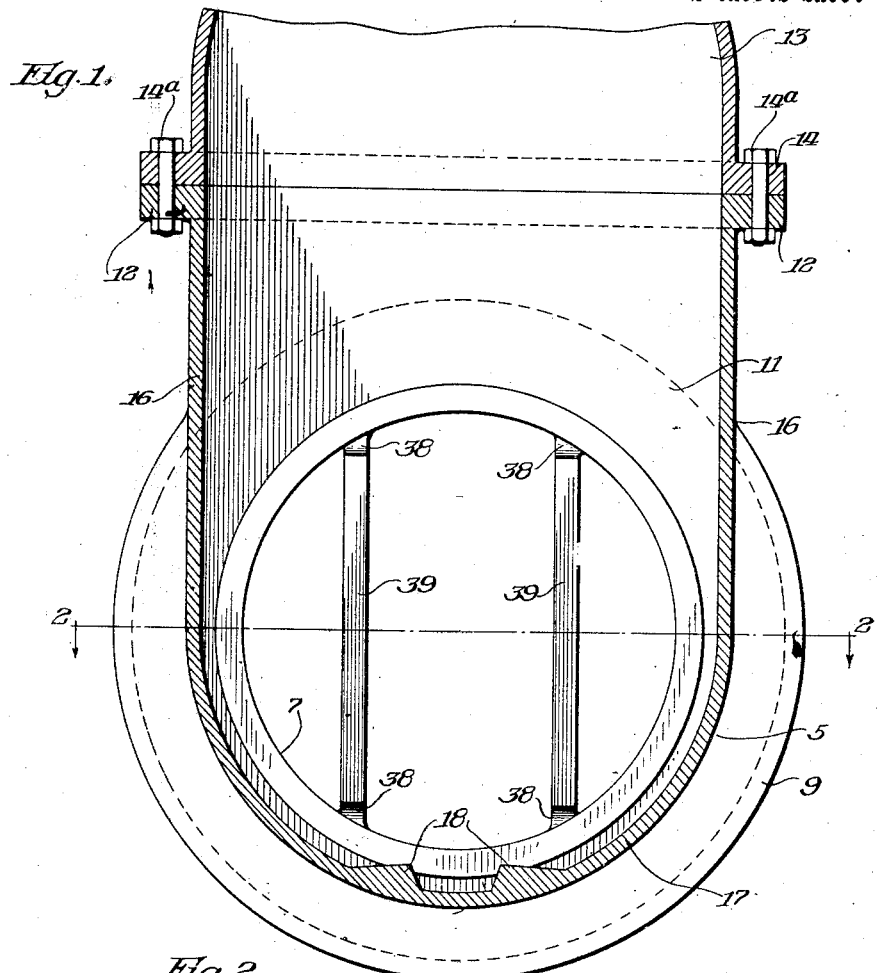
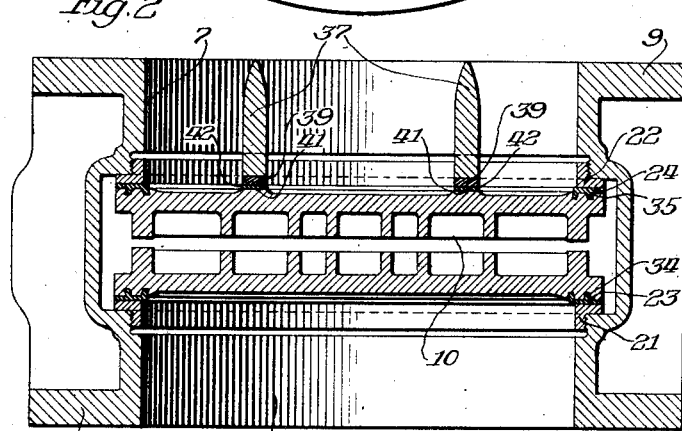
Witness:
Inventor:
Elmer Kenney Nickerson
By attorney

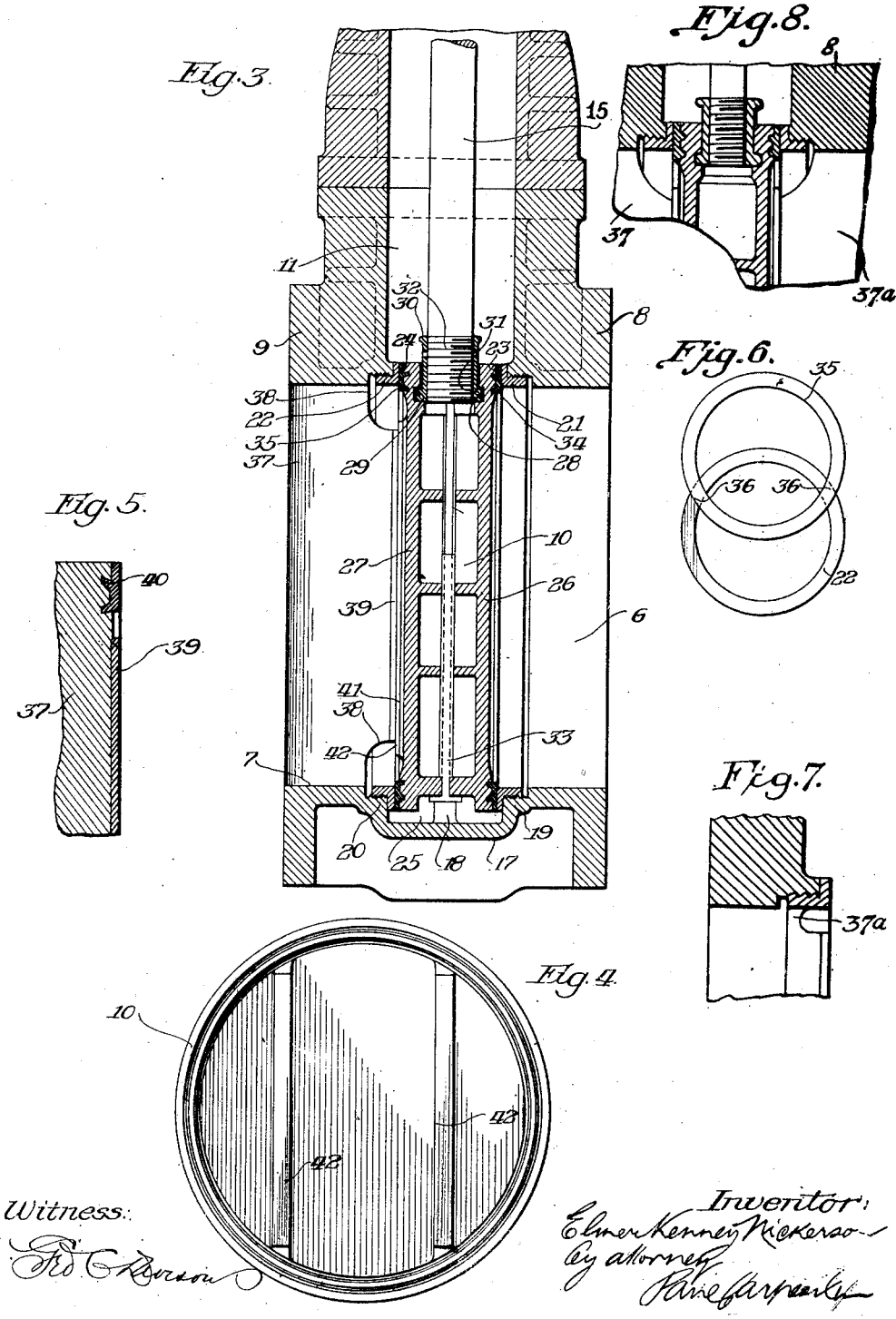

Patented Sept. 11, 1928.

1,683,625

UNITED STATES PATENT OFFICE.

ELMER KENNEY NICKERSON, OF SPRINGFIELD, MASSACHUSETTS, ASSIGNOR TO THE CHAPMAN VALVE MANUFACTURING COMPANY, OF INDIAN ORCHARD, MASSACHUSETTS, A CORPORATION OF MASSACHUSETTS.

VALVE CONSTRUCTION.

Application filed July 7, 1924. Serial No. 724,699.

This invention relates broadly to valves, and more particularly to improved means for reinforcing and guiding a valve during movement to and from its seat.

While this invention finds particular utility for and is described and illustrated in connection with a conventional form of sliding gate valve, it will be understood that it finds a wide field of utility for purposes other than but similar to that disclosed here.

With respect to sliding gate valves, or similar valves wherein the valve itself either slides laterally in a straight or curvilinear path across the valve seat which defines the fluid passageway, I find that, particularly in installations where the fluid, such as water, oil or the like is under high velocity or pressure, there is a tendency on the part of the fluid, due to the unequalized pressure thereof, to flex the valve, which causes the periphery of the downstream faces of the valve to be forced out of alignment sufficiently at times to cause the edge of the valve to strike the peripheral edge of the seat in closing or opening and either prevent or retard proper operation of the valve, and at best to increase the wearing of the parts at this point. Furthermore, a slight flexing of the valve relative its stem or a flexing of the stem will result, which is, for obvious reasons, at least undesirable. And this wearing steadily increases each time the valve is operated.

Another disadvantage which exists, more particularly in the multi part expansible gate valves now in common use, and to which this invention is applicable, resides in the incessant vibration or chattering of the valve plug or gate when in one of its intermediate positions, caused by the rapid flow of fluid through the valve port, which vibration often results in additional undue wear of the parts.

The foregoing disadvantages may, of course, in a measure be overcome by increasing the size of the valve or its parts, or both, but this is not an economical procedure as will readily be understood.

The principal objects and advantages of this invention reside in the provision of improved means for preventing undesirable flexing of the valve plug; means for guiding and reinforcing a valve; the provision of improved means for guiding and reinforcing a sliding gate valve; the provision of improved means for guiding and reinforcing the medial portion of a valve; the provision of improved means for guiding and reinforcing the medial portion of a sliding gate valve; the provision of improved means for guiding and reinforcing a sliding or oscillating gate valve or the like; the provision of means which cooperates with the valve seat and with a contact portion of a valve for reinforcing the valve during movement to and from its seat; the provision of improved means for cooperating with a valve seat and a contact face of a sliding gate valve for reinforcing and guiding the valve during movement to and from and while on its seat; the provision of improved means for reducing, or, in some instances, entirely eliminating chattering or vibration of the valve plug when in one of its intermediate positions; and the provision of an improvement of the character described which does not materially interfere with flow of fluid through the valve or with accurate seating of the valve, and which is simple and adds but little cost to the valve either in manufacture, maintenance or repair.

The foregoing and such other objects and advantages as may appear or be pointed out as this description proceeds are attained in the structural embodiment of this invention illustrated in the accompanying drawings, in which:

Figure 1 is a vertical transverse sectional view of a valve constructed in accordance with the present invention, the valve gate being omitted for the sake of clearness;

Figure 2 is a horizontal sectional view taken on line 2—2 of Figure 1, looking in the direction indicated by the arrows;

Figure 3 is a vertical longitudinal sectional view, showing the valve in closed position;

Figure 4 is an elevational view of the valve gate;

Figure 5 is a fragmentary sectional view of a detail; and

Figure 6 is a schematic view illustrating the relationship of a gate valve to its seat in course of movement.

Figure 7 is a fragmentary sectional view of a modified form of this invention.

Figure 8 is a fragmentary sectional view of a further alternative form of my invention.

Referring more particularly to the drawings, wherein for convenience in describing this invention, there is illustrated a sliding gate valve structure, I provide a casing 5, provided with ports 6 and 7, bordered by annular flages 8 and 9, which are connected respectively, to the up and down stream conduits (not shown), flow through which is controlled by the gate valve member generally indicated at 10.

The casing 5 is provided with a vertically extending auxiliary casing or chamber 11, provided with a laterally extending flange 12, and a head 13 is provided with a flange 14 connected fixedly to the flange 12 by bolts 14a—14a or the like. The head 13 is provided with a suitable fluid tight bushing, not shown, through which the valve stem 15 extends.

The lateral side walls 16—16 of the chamber 11 are substantially straight and serve to guide the valve gate 10 when lifted to open position. These walls 16 serve to guide the valve somewhat during its traverse. The walls 16 are joined by the circular wall 17 which is of greater diameter than that of the ports 6 and 7, and said wall 17 is provided with internal enlargements 18 which form stops against which the valve in closed position abuts.

The ports on their inner annular edges, are recessed to afford shoulders 19 and 20, and said shoulders afford an internally threaded recess for reception of the valve seat rings 21 and 22, respectively, said rings having annular bearing surfaces 23 and 24 presented toward each other and between which the valve gate 10 is introduced when sliding into closed position.

From the foregoing it will be observed that the enlarged portion formed by the wall 17 affords a pocket 25 for reception of the valve when in closed position, as best seen in Figure 3.

The valve gate 10 comprises the disc portions 26 and 27, said discs being provided with opposed recesses 28 and 29, respectively, said recesses being complemental to and adapted to receive the member 30, which latter is provided with a flange 31 which engages in the recesses 28 and 29 and serves thereby to connect the two disc portions 26 and 27 subject to relative movement of said discs as hereinafter appears.

The connecting member or plug nut 30 is internally threaded for engagement with the lower threaded end 32 of the valve stem 15.

In the medial portions of the valve gate sections 26 and 27, there may be provided a conventional wedge means now known in the art but not shown, which is operated by the wedge actuating members 33, extending vertically through the gate valve and projecting below same so as to contact with the stop members 18 when the valve moves to closed position for expanding the two disc portions into firm contact with the seat rings 21 and 22.

The discs 26 and 27 are each provided with contact rings 34 and 35, which are riveted or otherwise fixedly secured to the opposite faces of the disc portions 26 and 27, respectively, near the peripheries of the disc portions, for contact with the seat rings 21 and 22 during movement of the valve and when the valve is in closed position.

I find in the conventional sliding gate valve that during the movement of the valve as explained the area of contact between the rings of the valve seat and the rings of the valve gate is relatively small, in fact, confined to the space indicated at 36—36, in Figure 6.

As hereinbefore explained, it is the purpose of this invention to increase this effective area of contact during movement of the valve and when the valve is in closed position, and to this end, as will be seen in Figures 1, 2 and 3, I provide a pair of substantially parallel vertical posts 37, which extend across the port 7 and may be cast integrally with the valve casing, as shown, or bolted or otherwise secured thereto. The guide-posts 37 are, as shown in Figure 2, disposed in spaced symmetrical relationship across the fluid passageway on either side of and substantially parallel with the median line along which the valve moves, so that the valve member has substantially continuous contact with the guides during movement.

The posts 37 are recessed as at 38—38 at the edges presented toward the valve gate 10 and adjacent to the juncture of the posts with the valve casing so as to prevent sediment, débris or the like, from reaching the ring 22.

The inner edges of the posts 37 are lined with strips 39—39 which, as best shown in Figure 5, are riveted as at 40 or otherwise fixedly secured to their respective posts.

The contact faces of the strips 39 are presented toward the valve gate and are in substantially the same transverse plane as that of the contact face 24 of the ring 22.

The adjacent disc portion 27 of the valve gate is provided with raised enlargements 41—41 which are provided with contact strips 42—42 complemental to the strips 39 on the posts 37. These strips 42 may extend substantially entirely across the valve gate disc portions 27 as shown.

It will be obvious that while the posts 37 have been illustrated as secured integrally to or, in other words, cast with the valve casing, under some conditions, it might be desirable to cast these posts with the ring 22, as indicated at 37a in Figure 7, but in ordinary practice the mounting of the posts in the manner shown is economical and as the strips 39 permit of renewal similarly to the renewal of the valve seat ring, it will be apparent that the construction shown in Figure 3 is to be preferred.

While the reinforcing posts and contact strips of this invention have been disclosed as mounted on the down-stream side of the valve gate for the purpose set forth, it will be understood that these posts may be duplicated on the up-stream side, as shown as 37ª in Figure 8, or where flow takes place in both directions at various times through the valve it may be desirable to duplicate the reinforcing elements on the other side of the valve gate.

From the foregoing it will be observed that the reinforcing members described mounted on the casing and on the valve gate serve to increase the area of contact of the valve with the casing when the valve is off its seat so that flexing of the valve, due to the pressure of the fluid flowing therethrough, cannot take place, and, furthermore, the reinforcing means serves to guide the valve accurately onto its seat and prevents chipping or other damage to the valve seat rings or contact rings on the valve gate. It will be observed that the reinforcing elements carried by the casing do not offer any material resistance to the flow of fluid and that any débris which may collect on the posts 37 during the flow of fluid are removed from the posts, at least from the contact surfaces thereby, by movement of the valve. The additional advantage of reducing the chattering, or at least, preventing damage to the seat rings by such chattering, is brought about by the fact that when the valve is in its intermediate positions the abutments engage the valve gate sections and take the greater part of the impact due to chattering and thus relieve the seat rings to an appreciable degree.

Having thus described my invention and illustrated its use, what I claim as new and desire to secure by Letters Patent is:

1. In a valve, a casing having a passageway for fluid provided with a valve seat, a valve portion including a solid disk movable across said passageway for engagement with the valve seat, a plurality of spaced guide bars fixed to the casing and disposed symmetrically on either side of and substantially parallel with the median line along which the valve moves, and said valve portion having substantially continuous contact of the major portion thereof with said guide bars during movement to and from the seat, the guide bars having recesses adjacent to their extremities for affording outlets for foreign matter collecting on their faces.

2. In a valve, a casing having a passageway for fluid provided with a valve seat, a valve portion including complemental relatively laterally adjustable disk portions movable across said passageway for engagement with the valve seat, a plurality of spaced guide bars fixed to the casing and disposed across said passageway symmetrically on each side of and substantially parallel with the median line along which the valve moves, and said valve portion having substantially continuous contact of the major portion thereof with said guide bars during movement to and from the seat, and said valve seat being removable and adjustable along the axis of the passageway with respect to the contact surfaces of the guide bars and said valve portion to facilitate accommodation thereof to the relatively adjustable portions of the valve.

ELMER KENNEY NICKERSON.